US005485509A

United States Patent [19]
Oliver

[11] Patent Number: 5,485,509
[45] Date of Patent: Jan. 16, 1996

[54] TELEMETRY DEVICE INCLUDING A DYNAMIC OFF-HOOK DETECTOR

[75] Inventor: Stewart W. Oliver, Venice, Calif.

[73] Assignee: Telegenics, Inc., Los Angeles, Calif.

[21] Appl. No.: 128,865

[22] Filed: Sep. 29, 1993

[51] Int. Cl.⁶ .................................................. H04M 11/00
[52] U.S. Cl. ............................................. 379/106; 379/107
[58] Field of Search .................................... 379/106, 107, 379/102, 104, 105, 398, 377, 93, 94; 340/870.02, 870.03

[56] References Cited

U.S. PATENT DOCUMENTS

| | | | |
|---|---|---|---|
| 4,224,478 | 9/1980 | Fahey et al. | 379/93 |
| 4,455,453 | 6/1984 | Parasekvakos et al. | 379/106 |
| 4,833,618 | 5/1989 | Verma et al. | 379/107 |
| 5,202,916 | 4/1993 | Oliver | 379/107 |
| 5,204,896 | 4/1993 | Oliver | 379/107 |
| 5,235,634 | 8/1993 | Oliver | 379/107 |

*Primary Examiner*—Curtis Kuntz
*Assistant Examiner*—Jason Chan

[57] ABSTRACT

The telemetry device of the present invention overcomes the wide variation in operating parameters found in the telephone system by automatically tuning itself to the operating conditions sensed on the telephone line. More particularly, the invention dynamically adjusts the subscriber loop current to compensate for the variety of line conditions encountered. The telemetry device collects data at a remote location and transmits that data over a phone line back to a central station. The device includes a power supply which is coupled to the phone line to derive a power supply voltage therefrom to power the device. When the device enters an active state, it seizes the phone line before transmitting the collected data back to the central station. Upon entering the active state, a pre-loading circuit in the device progressively loads the device down until the power supply voltage within the device decreases to a first predetermined voltage level. The telemetry device also includes a voltage drop detector which is coupled to said power supply for detecting when the power supply voltage decreases to a second predetermined voltage level less than the first predetermined voltage level, thus indicating that a contending telephone device coupled to the phone line has come off-hook during the active state. When this occurs, the telemetry device immediately disengages from the phone line.

21 Claims, 4 Drawing Sheets

TELEMETRY DEVICE INCLUDING A DYNAMIC OFF-HOOK DETECTOR

CROSS REFERENCE TO RELATED PATENT APPLICATIONS

This patent application relates to my copending patent application entitled "Telemetry Device Including A Dynamic Off-Hook Detector Capable Of Operating In A Pulse-Dialing Environment", Ser. No. 08/128,864 filed concurrently herewith and assigned to the same assignee.

BACKGROUND OF THE INVENTION

This invention relates in general to data collection systems which use remotely located telemetry devices to transfer telemetry data from a remote site to a central processing location. More particularly, the invention relates to automatic meter reading (AMR) systems which use conventional subscriber telephone lines to transfer telemetry data, in the form of utility meter readings, from a customer's premises to a central processing location.

Prior to the existence of automatic meter reading (AMR) systems, the most common method for determining the amount of commodity delivered to a utility customer was to manually read a meter at, or in close proximity to, the consumer's premises. Because the utility meters were located at the point where the utility commodity was dispensed to the consumer, it became necessary for utility companies to establish routes where a "meter-reader" periodically visited each meter to record the amount of utility product consumed.

At present, many utilities, including gas, electric and water companies, continue to send meter-readers to consumer residences' to collect utility meter readings. However, there are practical limitations as to how often and how efficiently this procedure can be manually performed. For instance, weather and the ability to gain access to meters themselves (which are often inside the consumer's residence) directly impact the efficiency of this manual procedure. Today, where it is desirable for the utility to have almost instantaneous access to any meter, the manual method for collecting these readings is becoming both economically and operationally obsolete in view of the more sophisticated and reliable automatic techniques now available.

One very practical method for automating the process of collecting utility meter readings uses the existing telephone system and takes advantage of the already widespread availability of telephone service to both residential and business premises. Using this existing infrastructure, remotely located telemetry devices (at each consumer's premises) electronically upload utility meter readings as telemetry data to a central processing location via the subscriber telephone lines. This process is analogous to the procedure used by many PC users to electronically upload files by the use of a modem connected to the subscriber's telephone line, except that the AMR procedure is fully automatic. This invention relates to those AMR systems which utilize telephone line telemetry techniques.

In practice, the actual telemetry device used in an AMR system is called a meter interface unit (MIU). Located at the customer's premises, the MIU, as the name implies, is an interface between two different electrical environments. One side of the MIU, called the meter side, is connected to one or more utility meters while the remaining side, or line side, of the MIU is connected in parallel with, or across, the subscriber telephone line. In this regard, the telephone line side of the MIU is connected to the phone line in a manner similar to that used to add an additional extension phone, answering or FAX machine. Other than connecting the MIU to the subscriber line, no modification of the existing telephone line wiring is required.

In one particular type of AMR system, a real time clock within the MIU activates the device at a prescribed date and time. Once activated, the MIU seizes the phone line by taking the phone line off-hook, dials a preprogrammed telephone number to connect the MIU to a central processing station, reads the utility meters connected to it and then uploads the telemetry data from the MIU via the telephone line to the central station. Automatic meter reading systems which utilize this technique are known as dial-inbound systems, since the MIU dials into a central data processing center.

Since the telemetry transaction typically takes only a few seconds to complete, the MIU normally resides in a low power, standby condition (on hook) until such time as the programming of the MIU's real time clock causes the device to be activated again. Therefore, the MIU is said to be in a static mode between telemetry transactions and in a dynamic mode while engaged in the transfer of telemetry data across the telephone line.

An MIU may be viewed as an interface between two different electrical environments, namely the telephone line side and the meter side of the MIU. In order to protect both telephone company personnel and their counterparts in the utility industry from possible accidental electrocution, there is no DC continuity between the meter and telephone line sides of the MIU. Isolation is also required because the telephone subscriber loop must remain balanced, since translongitudinal imbalance would result in hum, noise and unacceptable loading of the telephone line. This isolation is obtained by using transformer (magnetic) coupling or optical coupling of signals on opposite sides of the isolation barrier.

With regard to the MIU itself, the terms meter and telephone line side more accurately describe how the telemetry device is electrically connected than how the MIU is operationally partitioned. For instance, because the meters attached to the MIU are typically read by a serial communication protocol similar to RS-232, a low power microprocessor is best suited to performing this task. Consequently, the same microprocessor may be used to format and transmit the telemetry data packet while simultaneously controlling the entire operation of the MIU. Therefore, functionally the meter side of the MIU is also called the control side.

Similarly, since it is desirable to have the MIU be self-powered from the phone line (with the exception of a small battery to sustain the real time clock in the static standby mode), the loop current from the central office switch provides the primary power source for the MIU. Consequently, the phone line side of the MIU is referred to as the primary side.

Because it is not acceptable for the MIU to disrupt or otherwise interfere with the normal operation of the subscriber telephone line, the MIU must include an "off-hook detector" or "line-status indicator" which is capable of detecting when the subscriber phone line is or is not in use. As noted before, the MIU is in either a static mode or a dynamic mode. As a result, the off-hook detector consists of not one function but two, namely a "dynamic off-hook detector" and a "static off-hook detector". The terms dynamic and static describe the current mode of the MIU.

Briefly, a "static off-hook detector" is employed when the MIU is in the static mode (standby state) to determine when the telephone subscriber commences use of the phone by lifting the telephone receiver or other telephone subscriber equipment seizes the phone line for communications use. In contrast, a "dynamic off-hook detector" is employed when the MIU is in the active state (MIU has seized the phone line and is actively transmitting data) to determine when the telephone subscriber commences use of the phone by lifting the telephone receiver or other telephone subscriber equipment seizes the phone line for communications use.

At first glance, the design of off-hook detectors may seem deceptively simple. However, getting them to function reliably, in practice, is a task requiring specialized design knowledge and skill. My patent, entitled Signal Processing Circuit For Use In Telemetry Devices, U.S. Pat. No. 5,202,916, the disclosure thereof being incorporated herein by reference, describes some of the complexities involved in designing a static off-hook detector for an MFG. Whereas the static off-hook detector serves to prevent the MIU from going to the dynamic (off-hook) mode while the subscriber line is in use, the dynamic off-hook detector permits the MIU to immediately disengage itself from the phone line should the subscriber attempt to use the telephone while the MIU is actively engaged in a telemetry transaction.

In practice, the dynamic off-hook detector is considerably more difficult to design than the static off-hook detector. The wide variation in operational parameters found within the telephone system complicates the task of designing a generic dynamic off-hook detector which functions reliably. Should the dynamic off-hook detector erroneously trigger during a telemetry session, the repeating malfunction may make it impossible to ever complete the telemetry transaction. In that case, the MIU would perpetually disengage itself from the line prior to the session's completion. At the other extreme, a dynamic off-hook detector which cannot detect a subscriber off-hook condition will not disengage itself from the telephone, thereby refusing to surrender up the phone line to the telephone subscriber, as it should. In fact, the task of designing this detector is so formidable that some MIU vendors do not even incorporate a dynamic off-hook detector function in their products. Since the functional requirements for static and dynamic off-hook detectors are different, each detector is customarily implemented as a separate device in conventional off-hook detectors.

One prior art dynamic off-hook detector approach is to sense the change in phone line loop current which occurs when the user takes a telephone device off hook. For example, the Schlumberger Model MIU T-3000 meter interface unit incorporates an analog to digital (A/D) converter for the sole purpose of periodically measuring the loop current on the primary side of the MIU. Although technically elegant, this is not a particularly cost effective implementation. Not only is the A/D converter expensive but additional components are required to transport the A/D's output (an 8–10 bit digital number representing the loop current) from the primary side of the telemetry device to the microprocessor on the control side of the isolation barrier. In addition, those skilled in the art will recognize that the environment under which line-powered telemetry devices must operate is one which is extremely power conscious. The A/D approach therefore has the added disadvantage that the A/D conversion consumes precious power resources.

SUMMARY OF THE INVENTION

One object of the present invention is to provide a telemetry device including a dynamic off-hook detector which detects, with high reliability, when the telephone user has taken the telephone set off-hook during the active state of the MIU.

Another object of the present invention is to provide a telemetry device including a dynamic off-hook detector which is capable of adapting itself to changing telephone line conditions.

Yet another object of the present invention is to provide a telemetry device including a dynamic off-hook detector which allows an MIU to recognize, and subsequently disengage itself from the telephone line, should the telephone subscriber interrupt a telemetry session by taking the telephone set off-hook.

In accordance with one embodiment of the present invention, a telemetry device is provided for collecting and transmitting data over a phone line back to a central station. The telemetry device includes a data collector for collecting data at a remote location. The device further includes a transmitter, coupled to the data collector, for transmitting the data over the phone line to the central station during an active state of the device in which the device seizes the phone line. The device also includes a voltage deriving circuit, coupled to the phone line, for deriving a voltage which is dependent on the loop current of the phone line. The telemetry device still further includes a pre-loading circuit, situated in the device, for loading the device down during the active state until this voltage reaches a first predetermined voltage level. The device also includes a voltage drop detector, coupled to the voltage deriving circuit, for detecting when this voltage decreases to a second predetermined voltage level less than the first predetermined voltage level, thus indicating that a contending telephone device coupled to the phone line has come off-hook during the active state.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

I. Operational Environment

Figure 1A:
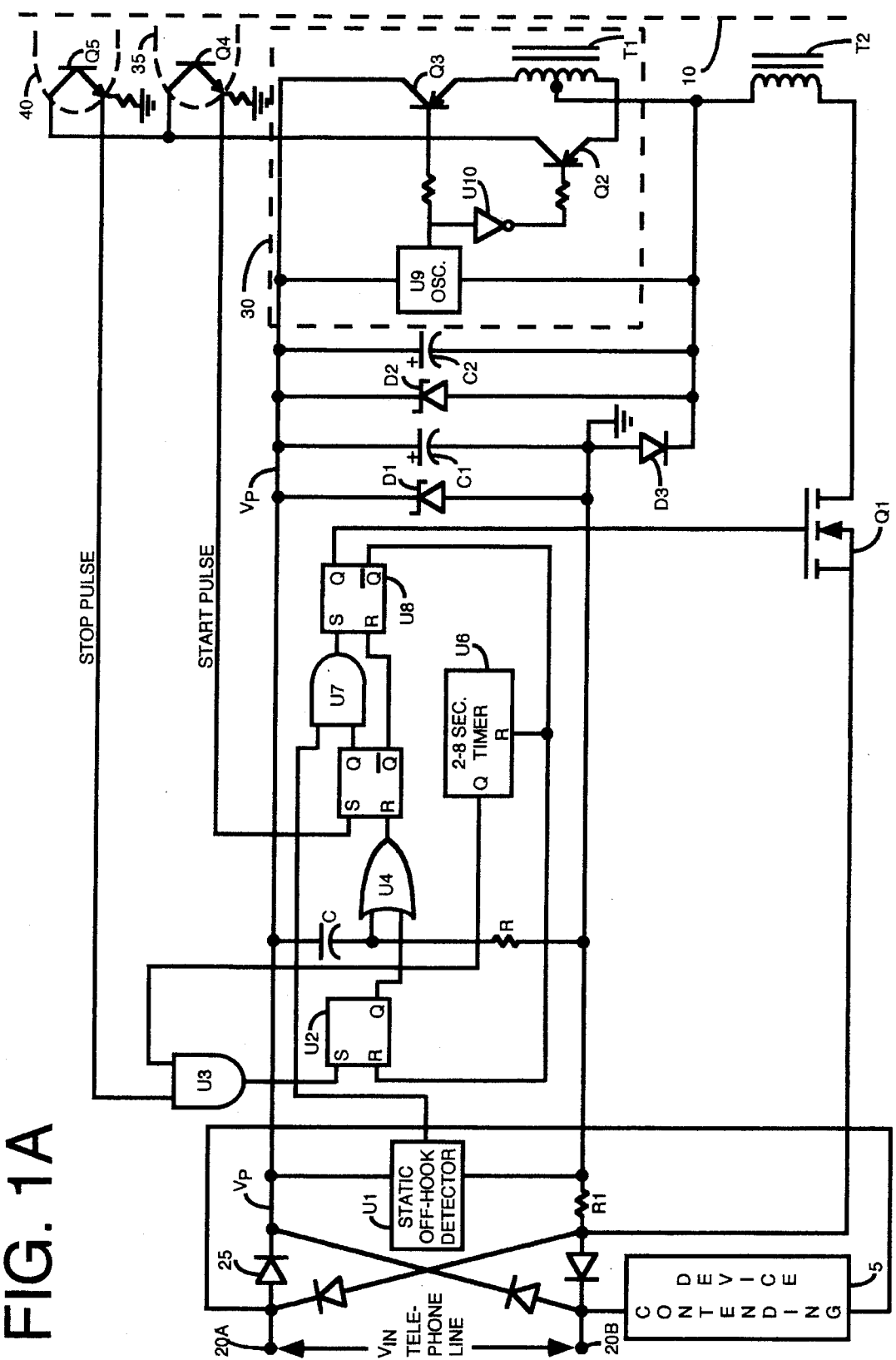
FIG. 1A is a simplified schematic diagram of the telephone line side of a telemetry device in accordance with the present invention.

As discussed above, AMR systems utilize the existing telephone system to collect telemetry data from a plurality of remotely located meter interface units (MIU's). To be cost effective, the MIU shares the existing telephone line with the subscriber telephone set without significantly interfering with the subscriber's usage of the telephone system.

Functionally, the MIU can be considered to be a "smart" telephone in that it automatically determines when the phone line is available for the MIU's use (via the static off-hook detector), takes itself off-hook, dials a preprogrammed telephone number, communicates over the phone line, and then hangs up. The telephone central office system cannot distinguish the operation of the MIU from a manual telephone call which the subscriber might make.

When a telephone device is taken off-hook, the impedance at the terminals of that device drops from a very high on-hook impedance to a few hundred ohms. With the normally open end of the subscriber line now terminated with this low impedance, the telephone set draws a loop current from the central office switch of approximately 40 mA. As long as loop current is being drawn, the central office switch sees the subscriber line as being off-hook. The telephone audio signal appears as a direct modulation of the loop current, namely as an AC signal superimposed on the DC loop current.

Although the loop current is nominally 40 mA, the actual value of the loop current depends upon a multitude of factors. For instance, each wire in the two-wire cable pair which runs from the central office to the subscriber's premises has a series impedance associated with it. The actual resistance value depends upon the length of the cable run, the type of wire and other cable characteristics. Additional factors, such as the age and condition of the cable, also affect the series impedance of the telephone line. Furthermore, the off-hook terminating impedance of the subscriber telephone set significantly affects the value of the line impedance seen at the terminating end (at the central office switch) of the cable. When these external variations are coupled with the tolerances of the central office equipment itself, the magnitude of the loop current can vary greatly from circuit to circuit.

Recalling that the MIU must be able to detect when another telephone device, ostensibly the subscriber telephone set, has interrupted a telemetry session, it can be seen that the dynamic off-hook detector function is unique to the MIU. That is, the subscriber telephone set is always manually disengaged, by hanging up the telephone, and does not require a dynamic off-hook detector. In contrast, a properly designed MIU must automatically disengage itself from the phone line when a contention for the circuit arises. When the MIU telemetry session is interrupted by a contending telephone device on the same phone line, the contending telephone device 5 appears in parallel across the MIU's input terminals, as a shunt load. Therefore, if both devices had identical impedances, half the loop current would be shunted away from the active MIU. The dynamic off-hook detector function can be implemented by sensing this "current robbing" which is caused when the contending device comes on line.

A telemetry device including a dynamic off-hook detector which senses current robbing by the contending device to determine line status is described and claimed in my patent entitled "Outbound Telemetry, Device", U.S. Pat. No. 5,204,896, the disclosure of which is incorporated herein by reference. Contending telephone devices include the standard subscriber telephone set, modems, fax machines or any other subscriber device hooked to the telephone line.

Unfortunately in practice, both the loop current and the shunting impedance of the contending device can vary greatly, making it difficult to set a reliable trigger point for such a dynamic off-hook detector. The problem is compounded still further by certain telephone configurations, such as party lines and remote office extensions, where the contending device can be miles away from the MIU.

One approach to accommodate these wide variations in off-hook loop current would be to provide an adjustable component in the MIU which could be manually adjusted by the installer to set the trigger point for the off-hook detector. This approach is not economically desirable because each MIU would require substantially more installation time at the user's premises. Moreover, the MIU expense would be increased by the cost of the adjustable component which typically costs more than a fixed value component. The MIU expense would also be increased because a more well-sealed, weather tight (and expensive) MIU housing would have to be used to assure that the setting of the adjustable component is not disturbed by a hostile environment.

However, even if the use of a manually adjustable component were not the issue, the telephone company often changes, unbeknownst to the subscriber, the physical cable pair used by the subscriber, as it maintains or upgrades the phone lines. Such a change would render useless the initial adjustment of the adjustable component performed by the installer.

II. Theory Of Operation

The present invention overcomes the wide variation in operating parameters found in the telephone system by automatically tuning itself to the telephone line. Prior to the beginning of each telemetry transaction, the MIU dynamically adjusts the amount of loop current it draws to a predetermined optimum value to set the trigger point for the off-hook detector. Essentially, this pre-biases the MIU to an operating point where the dynamic off-hook detector is most capable of detecting when a contending telephone device has come off-hook.

As mentioned briefly above, the dynamic off-hook detector described in my patent entitled "Outbound Telemetry Device", U.S. Pat. No. 5,204,896, senses the current robbing effect of the shunt load of the contending device to disengage an active MIU. Fundamentally, this MIU was designed to require a nominal amount of current to operate; this was not necessarily the minimal amount of current. Furthermore, the design of the MIU was such that it could not operate unless the loop current was in excess of this nominal value. In other words, the MIU would return to the static mode unless it could pull sufficient current from the subscriber loop to retain it in the dynamic mode.

In principle, by judiciously selecting the nominal loop current required to operate the MIU, it could be assured that another off-hook device (contending device) would shunt away enough current to cause the active MI to "intentionally malfunction" and cease transmitting data, thus returning it automatically to the static mode and thereby releasing the subscriber line. In that MIU, the basic design of the MIU partially determined the required operating current and a fixed value load resistor was used to increase the operating current to the nominally desired value. Although this technique worked well for the average subscriber loop, it had the disadvantage that the fixed value load resistor wasted power which is especially precious for line powered devices.

In practice, variations in both the central office loop current and the off-hook impedance of the contending telephone devices limited the dynamic range of this technique. On weak current loops the nominal loop current required by the MIU proved to be excessive and prevented the MIU from operating. Conversely, on strong loops, another off-hook contending telephone device, especially one with a high off-hook impedance, could not steal away enough current from the MIU to current starve it back into the static mode. To compensate for this limitation, one embodiment of the present invention replaces the aforementioned fixed value resistor with a resistor whose value can be adaptively adjusted under program control of the MIU microprocessor.

The MIU of the invention operates by adaptively loading the subscriber loop to compensate for wide variations in the loop current, thus permitting a predictable loop current change to occur when another telephone device comes off-hook. Irrespective of the loop characteristics, this current change becomes both predictable and constant thereby allowing the presence of the contending telephone device to be detected.

III. Schematic Description: MIU Overview

Figure 1B:
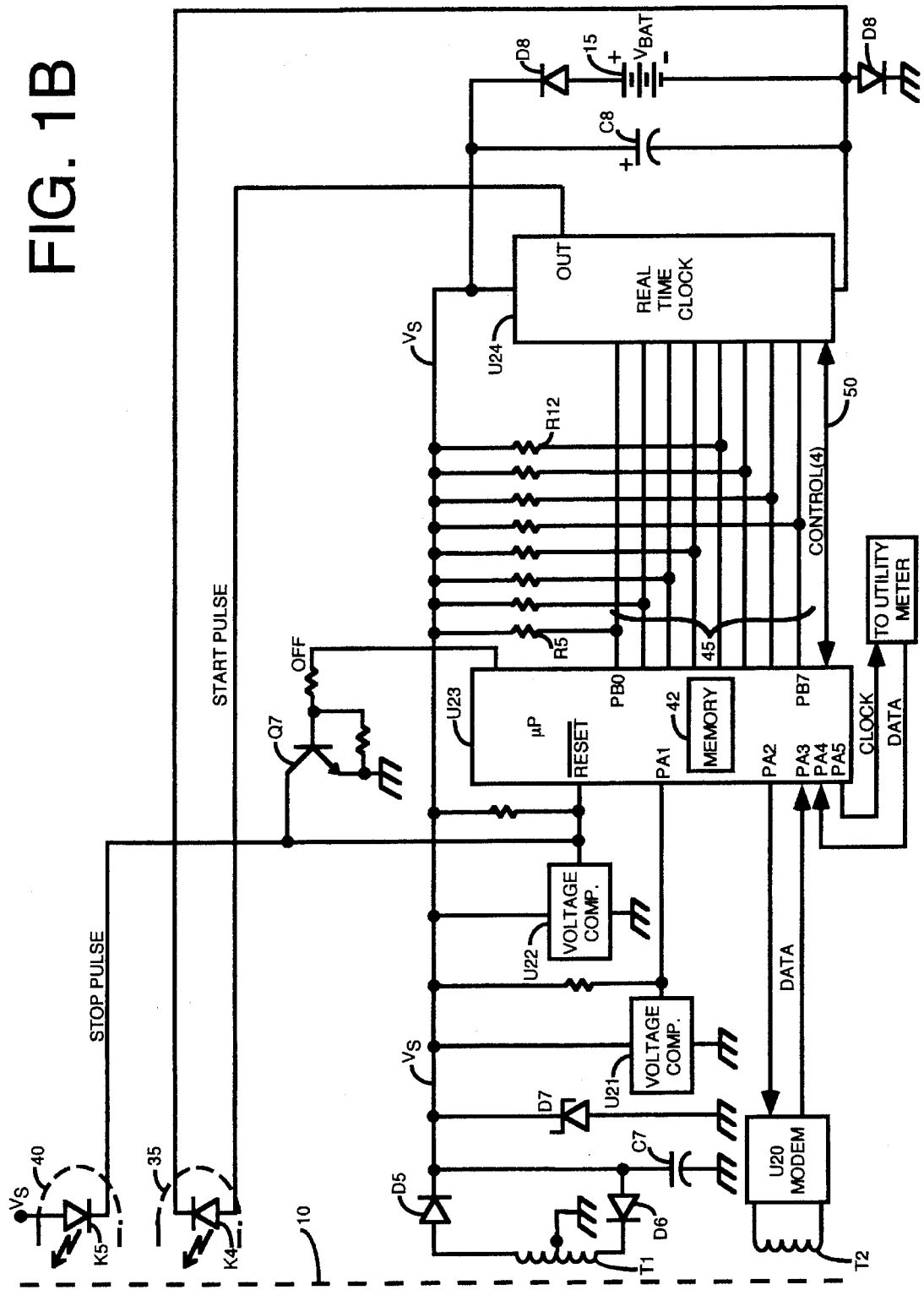
FIG. 1B is a simplified schematic diagram of the control side or meter side of a telemetry device in accordance with the present invention.

FIGS. 1A and 1B show a simplified schematic diagram of an MIU as being composed of two parts. FIG. 1A shows the components on the telephone line side of the MIU (alternatively referenced as the primary side), while FIG. 1B shows the components on the meter side (alternatively referenced as the control side). It is noted that each side is electrically isolated from the other, either optically, by the use of opto-couplers, or magnetically, by the use of transformers. This point of demarcation is collectively referred to as an isolation barrier and is designated as barrier 10 in FIG. 1A. Functionally, isolation barrier 10 protects equipment and personnel on either side of the MIU and also assures that the telephone line remains electrically balanced and isolated from ground, as it must for proper operation.

Most of the novel elements of the invention are contained on the control side of the MIU, in FIG. 1B. However, FIG. 1A is included for completeness to show how a complete MIU is configured when operating in conjunction with the invention. Accordingly, FIG. 1A is a simplified representation of the line side of a functional MIU.

Although FIG. 1B shows the preferred embodiment of the invention, the techniques taught by this invention can be implemented in several different ways. Therefore, it should be understood that the embodiment shown represents just one implementation. Other implementations are possible and examples of these implementations will be discussed after the discussion of the preferred embodiment.

Before discussing the operation of the MIU, it is important to note that the MIU illustrated is one which is line-powered. That is, the MIU draws all of its operating power from the telephone line itself, with the exception of a small battery 15 which maintains the real time clock U24 as seen in FIG. 1B. In the static mode, this power is very minute, namely less than 10 µA as per FCC requirements. To meet this stringent low current requirement, all the logic shown on the primary side of the MIU (FIG. 1A) is static CMOS logic. Since CMOS logic consumes virtually no power unless some logical input changes state, the standby current of the MIU can be made extremely small. To appreciate how small this current is, it is noted that the value of resistor R1, which limits the standby current drain of the CMOS logic, is approximately 6–10MΩ.

Referring to FIG. 1A, the open circuit voltage, $V_{IN}$, of the telephone line (approx 48 volts) appears at the input terminals 20A and 20B of the MIU when the line is first connected to the MIU. A diode bridge 25, consisting of four diodes, at the MIU input assures that the MIU is polarity insensitive since the bridge assures that the more positive voltage potential always appears on the $V_p$ side of the bridge. For reasons explained shortly, when the phone line is first connected to the MIU or when the MIU is first turned on and initialized, power FET Q1 is off so no current is drawn through that device. Hence, only a small amount of current is drawn through zener diode D1 and resistor R1. Zener diode D1 and parallel capacitor C1 form a simple voltage regulator to stabilize the operating voltage of the MIU's CMOS logic (later described) at approximately 5 volts, which is the zener voltage of diode D1. Recalling that the value of R1 is approximately 6–10MΩ, the current drain of the MIU in the static, quiescent state is minuscule.

When the MIU is first connected to the telephone line, i.e. when the MIU is first powered up, the series resistor R and capacitor C together act as an R-C circuit which momentarily holds the input to OR gate U4 at a logic high state. This provides a "one-shot" power-up pulse to the reset input of SR (set-reset) flip-flop U5 so as to initialize all the logic on the primary side of the MIU (FIG. 1A). The width of this power-up pulse is proportional to the R-C time constant and causes SR flip-flops U5, U8 and U2 to be reset in sequence; the reset condition is one where the Q output of the flip-flop is a logic low and the Q (or not-Q) is a logic high. Since the SR flip-flop U8 is reset, the Q output is a logic low assuring that power ZFET Q1 is turned off at initialization as earlier stipulated.

The above described logical state of the MIU is the static or quiescent mode, as referenced earlier. In this static state, with FET Q1 off and diode D3 blocking any return current, only components to the left of capacitor C1 are actively biased by leakage current from the subscriber loop or phone line. The minuscule standby current drawn by the MIU in this static state is sufficient to operate the CMOS logic and establish an operating voltage across zener diode D1 prior to returning to the phone line through the resistor R1. (The logic devices of the MIU are implemented in CMOS logic to keep any current drain from the phone line as low as possible.)

To place the MIU in the active mode, power FET Q1 is turned on. In the on state, the series impedance of the FET is only a few ohms, thus causing the MIU to draw substantial loop current (20–80 mA) through zener diode D2 and the low DC resistance of the primary winding of transformer T2. Zener diode D2 in conjunction with the filter capacitor C2 forms a voltage regulator to stabilize the operating voltage for a power inverter 30 formed by oscillator U9, inverter U10, transistors Q2 and Q3, and center-tapped transformer T1 (FIG. 1A).

Shortly after the MIU goes off-hook, drawing current from the subscriber loop, the voltage appearing across the filter capacitor C2 causes the oscillator U9 of power inverter 30 to become operative. The output of oscillator U9 is essentially a square wave with approximately a 50% duty cycle. The oscillator U9 turns on transistors Q3 and Q2 (via inverter U10) on opposite phases of the square wave, alternately energizing each side of the center-tapped transformer T1. The switching action of transistors Q2 and Q3 on the primary side of transformer T1 (FIG. 1A) drives an AC power signal into the transformer which is magnetically coupled to the transformer's secondary winding (FIG. 1B) on the other side (meter side) of the isolation barrier 10. The recovered AC power signal appearing across the secondary winding is then full wave rectified by diodes D5 and D6 and filtered so as to provide DC operating power (power supply voltage $V_s$) for the components on the meter side of the MIU. Thus, operating power for the MIU in the active mode is derived entirely from the telephone line loop current. (It is also possible to use a single phase power inverter, instead of a center-tapped design shown here, but the conversion efficiency would be less.)

Again referring to FIG. 1A, several other components are present on the telephone line side of the MIU. Most noticeably, a static off-hook detector U1 monitors the telephone line input to the MIU and provides a logic high indication if the telephone line is available for use. (My patent entitled "Outbound Telemetry Device", U.S. Pat. No. 5,204,896, describes in detail one static off-hook detector circuit which may be employed as detector U1.) Also, a timer U6 provides a logic high output once 2.8 seconds, or more, have elapsed since the timer was enabled by removal of a logic high resetting signal. Finally, two receptor transistors Q4 and Q5 for a pair of opto-couplers, 35 and 40, respectively, allow logic signals to be transferred across the required isolation barrier 10, from the meter side (FIG. 1B) to the line side (FIG. 1A). Each opto-coupler includes a sender, namely a light emitting diode (LED) which is optically coupled to, but electrically isolated from, the receptor transistor. When the LED is activated, the light falling on the receptor transistor causes the transistor to turn on.

Previously, it was noted that to switch the MIU from a static mode to an active mode required FET transistor Q1 to be turned on, from its normally off condition. It will be shown that, at an appointed alarm time, the MIU's real time clock U24 (FIG. 1B) will generate a short start pulse. This start pulse will be transferred across the isolation barrier 10 via opto-coupler 35, momentarily activating transistor Q4 (FIG. 1A) on the line side of the MIU. Recalling that in the static mode all SR flip-flops are initially reset (Q=logic low), the momentary logic high appearing on the set input of SR flip-flop U5 will set the Q output to a logic high.

If at this time the telephone line is not being used, the output from the static off-hook detector U1 will also be a logic high causing AND gate's U7 output to go high. If, however, the telephone line is in use by a contending telephone device, the logic high output from AND gate U7 will be delayed until such time as the static off-hook detector U1 indicates that it is available. Subsequently, SR flip-flop U8 will be set, turning on FET Q1. So long as FET Q1 is on, the MIU is in the active mode (off-hook) and pulls current from the telephone subscriber loop. At the same time as FET Q1 is turned on, the Q output of SR flip-flop U8 goes to a logic low, enabling 2.8 second timer U6 and removing the forced reset condition on SR flip-flop U2.

With the MIU active, oscillator U9 is activated and supplies power to the meter side of the MIU, per the prior discussion. It will be shown subsequently, that transformer T2 couples DTMF (dual tone multi-frequency) dialing tones and telemetry data across isolation barrier 10 and onto the phone line, thereby dialing and transferring the telemetry data to a remote site via the subscriber loop.

When the telemetry data transfer is complete, the logic on the meter side (control side) of the MIU (FIG. 1B) will generate a short stop pulse which is coupled across isolation barrier 10, in a manner analogous to that described for the start pulse. If 2.8 seconds, or more, have elapsed since the MIU entered the active mode, this momentary logic high pulse will set the Q output of SR flip-flop U2 to a logic high, via AND gate U3. The timer U6 provides a power-up guard time of 2.8 seconds to permit the MIU logic on the control side to power up and become functional before enabling one of the AND gate U3 inputs; once the guard time has elapsed a stop pulse can set SR flip-flop U2. Should this occur, the logic high Q output of SR flip-flop U2 will cause SR flip-flop U5 to be reset (via OR gate U4) which will, in turn (via the logic high Q output) then reset RS flip-flop US. When SR flip-flop U8 is reset the Q output goes low, turning off FET Q1, while its Q output goes to a logic high state, disabling timer U6 and resetting SR flip-flop U2 which initiated the described active mode. It can be seen that all SR flip-flops are now reset and that the MIU is logically in the static mode described earlier.

IV. Schematic Description: Dynamic Off-Hook Detector On The Meter Side Of The MIU-Overview Having discussed the primary side or line side of the telemetry device of FIG. 1A, the discussion now turns a more detailed discussion of the meter side or primary side of the telemetry device as seen in FIG. 1B.

Referring to FIG. 1B, the full wave rectifier and filter capacitor described earlier, consisting of diodes D5 and D6 and capacitor C7, can be seen. The zener diode D7 in conjunction with capacitor C7 stabilizes the DC operating voltage $V_s$ on the meter side (control side) of the MIU. For reasons explained shortly, zener diode D7 has a zener voltage (approx 5.6 volts) slightly larger than the nominal operating voltage of the logic (5.0 volts). The LED's K4 and K5 associated with the start and stop pulse opto-couplers 35 and 40, respectively, (FIG. 1B) transfer logic level signals across isolation barrier 10 to receptor transistors Q4 and Q5 on the line side (primary side) of the MIU (FIG. 1A). It should be noted that the grounds shown on either side of isolation barrier 10 are not common with one another and different ground symbols are therefore used. These grounds serve as voltage datums and are not earth grounds.

Also shown in-the meter side of FIG. 1B is a modem U20 which is connected to a telephone hybrid transformer T2. These are both commonly available devices. For instance the modem U20 could be a commercially available, off-the-shelf device such as the SC11016 manufactured by Sierra Semiconductor. This device is a single IC chip modem containing a complete 300/1200 bit per second modem, including tone dialing capability. A simplified connection to a small microprocessor U23 is shown whereby the modem transfers and receives data and/or instructions from the processor. The techniques required to communicate with the modem are published in the part's specification sheet and these techniques are commonly understood by those skilled in the art. For this discussion, under microprocessor control, the modem can be commanded to tone dial a telephone number and establish a full duplex data pathway via the telephone circuit.

Also connected to the microprocessor are two voltage comparators, U21 and U22. These off-the-shelf devices are designed as supervisory circuits for microprocessors and generate a logic low resetting signal should the input voltage drop below a predetermined level. Typically, these three terminal comparators are available in a variety of preset trigger points. One embodiment of the method taught by this invention requires the two voltage comparators to have different trigger voltages. For the implementation shown in FIG. 1B, voltage comparator U22 has a threshold trigger voltage which is less than that of comparator U21. Using parts manufactured by Ricoh, U22 could be a model RH5VA40 comparator and U21 could be a model RH5V50 comparator with threshold voltages of 4.0 and 5.0 volts respectively. Since output from these devices are of the open drain variety, a pull-up resistor is required on the output of each comparator to assert a logic high state.

The function of voltage comparator U22 is to hold the processor U23 reset until bias voltage exceeds 4.0 volts. There are two operational scenarios where the comparator U22 output is a logic low, which resets processor U23. Firstly, during the power-up sequence, processor U23 is held reset until the bias voltage exceeds the threshold voltage of comparator U22, thereby allowing the processor to start only after a safe operating voltage has been reached. And, secondly, as the processor is powered down to an off condition (as when the MIU returns to the static mode from the active mode) it is held reset once the bias voltage droops below the threshold voltage of comparator U22. In parallel with the output of voltage comparator U22 is the normally open collector of transistor Q7. Under processor control, transistor Q7 can be turned on so as to force the MIU back to the static mode, via opto-coupler LED K5.

The microprocessor shown as processor U23 is a commonly available single chip microcontroller with an 8 bit architecture, such as the Motorola MC68HC705C8. This processor has a nonvolatile memory 42 which can retain selected MIU data even after the power has been turned off, for instance the telephone number the MIU dials after it is activated and enters the active state. The processor can communicate on a bus 45 with a variety of peripheral devices, including for example the real time clock U24, shown in FIG. 1B. This real time clock U24 is connected to the 8 bit wide data bus 45 and is a commercially available part, such as the Ricoh RP5C15. Four control lines form a control bus 50 between microprocessor U23 and real time clock U24 to facilitate communications between the devices.

Diode D8 assures that the voltage appearing across the power supply terminals of real time clock U24 can never be less than one diode drop below the battery 15 voltage, thereby maintaining constant power to the clock U24. Since the MIU spends most of its time in the static mode, diode D9 blocks any return current to the negative battery terminal assuring that only the real time clock consumes precious battery power in this static or standby mode.

Since CMOS logic inputs cannot be allowed to float, eight pull-up or pull-down resistors are used on the bus. Normally, pull-up resistors are high value terminating resistors (100KΩ or greater) and consume very little power. However, the preferred embodiment of the invention takes advantage of these pull-up resistors to minimize the parts required to implement the invention. More particularly, eight pull-up resistors (R5 to R12) are selected to be equal valued with a substantially lower than normally used resistance of 3.3KΩ. By switching in one or more of these low value resistors, the power consumption on the meter side (control side) of the MIU can be varied.

The resistors are logically selected by bringing the desired data bus line (or lines) of data bus 45 to a logic low state which will result in current flow through the selected resistor or resistors. In this manner, the 8 bit data bus 45 can be unloaded (i.e. no resistors selected) to draw a minimum amount of current or loaded as low as 413 ohms (3300 ohms/8) to draw a maximum amount of current. With the configuration shown, using equal value resistors of 3.3KΩ, the bus can have 9 possible loads (none, 3300, 1650, 1100, 825, 660, 550, 471, and 413 ohms) each with correspondingly different current drains pulled through the microprocessor and therefore through the subscriber loop.

Since the maximum loop current which can pulled from the central office (telephone line) is limited, and by design of the inverter 30 which provides the power to the meter side (control side) of the MIU, the power supply operating voltage $V_s$ can be made to vary in proportion to the load resistors (R5-R12) selected. It is noted that, the operating voltage $V_s$ will decrease as the load resistors, which waste power, are switched in sequentially. When the supply voltage $V_s$ drops below the threshold voltage of voltage comparator U21 (5.0 volts) the microprocessor, by checking the logical output of comparator U21, can detect this change. In this manner, the microprocessor can dynamically load the data bus with enough resistance to stabilize the power supply operating voltage $V_s$ at approximately 5 volts.

V. Dynamic Off-Hook Detector: Meter Side—Detailed Operation

With all the elements of FIG. 1A and FIG. 1B now described, the operation of the MIU and the invention can be more fully explained. This discussion starts with the MIU depicted in FIG. 1A and 1B and assumes that the MIU is initially in the static mode (static state), and traces the operation of the MIU as it enters the active mode (active state) where the techniques of this invention are primarily implemented.

Referring to FIG. 1B, with the MIU in a standby condition (static state) the only electrically active components are those of the real time clock U24 which is maintained by small battery 15. This real time clock U24 has an alarm feature which causes the clock to output a short pulse at a predetermined time and date. In the prior telemetry session with the central station, the current alarm time and date for the MIU was set by the central station prior to the conclusion of the telemetry exchange and the real time clock was appropriately programmed. At the appointed moment or alarm time, the clock will output a short pulse which will be transferred across isolation barrier 10, via the activation of opto-coupler LED K4. If the telephone line is available, or when it becomes available, the MIU will enter the active mode as previously described, causing a power signal to be present on the secondary winding of power inverter transformer T1 (FIG. 1B). This signal is full wave rectified and provides the power supply operating voltage $V_s$ to components on the meter side (control side) of the MIU.

As the filter capacitor C7 begins to charge, the supply voltage $V_s$ will rise to about 5.6 volts, the breakdown voltage of zener diode D7. At some point below the 4.0 volt threshold of comparator U22, the logic low output will activate the opto-coupler LED K5 by generating a stop pulse. However, as noted earlier, the design of the MIU is such that it ignores any stop pulse generated within the first 2.8 seconds after the MIU becomes active so the stop pulse generated as the MIU powers up into an active mode is ignored. When the supply voltage $V_s$ exceeds 5 volts, the outputs of both comparators are logic highs and the process of adaptively selecting the load resistors begins.

After a short power-up delay, the processor is ready to dynamically adjust the load on the meter side (control side) of the MIU. Initially, the processor sets all eight bits of data bus 45 to a logic high (i.e. no load). After checking to make sure that comparator U21 output is a logic high (i.e. supply voltage above 5.0 volts), it then loads the bus by switching in one loading resistor ($R_5$–$R_{12}$) at a time by setting the appropriate microprocessor port to a logic low. As each loading resistor is switched in, processor U23 checks the output of comparator U21, looking for a logic low condition. If the comparator output remains unchanged, the next load resistor is switched in and the process repeats. In this manner, the processor will sequentially switch in load resistors until the supply voltage drops below the 5.0 volt threshold of comparator U21. When this occurs, the processor releases the last selected load resistor, assuring that the supply voltage $V_s$ is slightly above 5.0 volts. The number of load resistors selected will be determined by the characteristics of the individual subscriber loop (telephone line). Strong loops may require that all resistors be enabled, while weaker loops may require that few or no resistors be enabled to draw current, thereby loading the bus.

With the power consumption of the active MIU dynamically adjusted in the manner described, any current pulled away from the MIU by a contending off-hook telephone device will cause the supply voltage $V_s$ on the meter side (control side) of the MIU to droop. Since this supply voltage $V_s$ was set by adaptively loading the bus, this technique assures that $V_s$ must change downwardly if some of the available source current is shunted away from the active MIU. More importantly, this power supply voltage $V_s$ must drop from the known level set by the adaptive loading technique. Thus, when an active telemetry session is interrupted by another contending telephone device coming off-hook, the supply voltage $V_s$ on the control side of the meter drops from its nominal value (about 5.0 volts) fairly quickly. When it drops below the threshold voltage of comparator U22 (nominally 4.0 volts) the comparator activates opto-coupler LED K5 causing a stop pulse to appear on the primary side of the MIU, thereby immediately disengaging the MIU from the telephone line. A fast acting and accurate dynamic off-hook detector feature is thus implemented.

Assuming that the active MIU is not interrupted, the microprocessor U23 in the MIU will communicate with peripherals on eight bit data bus 45, read the meters attached to it via a serial communication protocol, instruct modem U20 to tone dial a telephone number and establish a data connection with the central processing center, send collected telemetry data, or receive telemetry data, and finally, hang up the MIU by activating transistor Q7 to disengage the MIU from the phone line via the opto-coupler LED K5.

Communications with peripherals (such as real time clock U24) on data bus 45 require that the bus resistors be momentarily released for data transactions, but these communications are brief in comparison to the time constants associated with the power supply; hence communications on bus 45 have minimal effect on the dynamic loading of the MIU. It is noted that the telemetry transaction is bi-directional; that is, utility meter information and MIU status information are uploaded to a central processing location and information, such as that needed to program the real time clock for the next alarm time and date, can be downloaded to the MIU during the telemetry transaction.

The adaptive technique taught by this invention has one further advantage in that it acts a shunt voltage regulator, eliminating the need for a separate voltage regulator on the meter side (control side) of the MIU. This makes it more cost effective since fewer components are ultimately required to build the MIU.

While the particular adaptive technique demonstrated above used equal value resistors ($R_5$ to $R_{12}$) to load the bus, there is no requirement for all of these loading resistors to be equal valued. For instance, the loading resistors could be binary weighted values which would permit the MIU to load the bus with relative resistor values from 0 to 255 (an eight bit bus has 256 combinations) instead of the nine values illustrated in the preferred embodiment.

VI. Operational Flow/Flowchart

Figure 2:
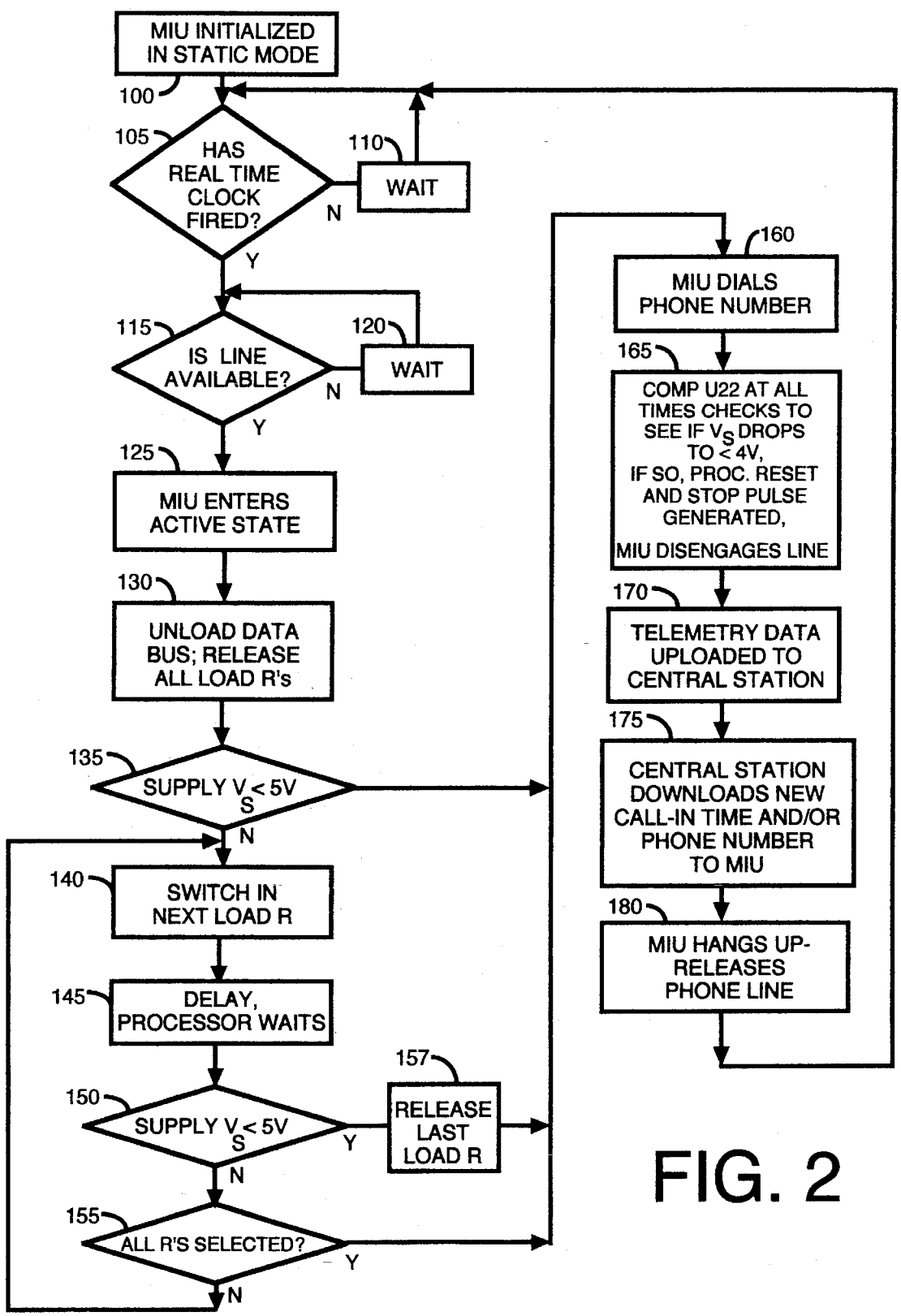
FIG. 2 is a flow chart depicting the operational flow of one embodiment of the present invention.

FIG. 2 is a flow chart which shows the general operational flow of an MIU in which the present invention is practiced. The MIU is initialized in the static or standby mode as per block 100. A test is then performed at decision block 105 to determine if real time clock U24 has counted to its appointed alarm time. If not, then the MIU waits until the appointed alarm time arrives as indicated by wait block 110. Once the appointed alarm time has arrived, flow continues to decision block 115 where static off-hook detector U1 determines if the phone line is available. If the phone line is not available, then the MIU waits until it is available as indicated by wait block 120.

Once the phone line is or becomes available, the MIU then enters the active state wherein the MIU seizes the phone line at block 125. The loading circuity in the MIU is then instructed to assume a minimum line loading level. For example, in this particular embodiment, data bus 45 is unloaded at block 130 by releasing all loading resistors on the bus.

At decision block 135 comparator 21 then checks to see if, at the present loading level, power supply voltage $V_s$ has dropped to less than 5 volts. If the power supply voltage $V_s$ has already dropped to less than 5 volts and no loading resistors have been switched in to load the MIU, then a very weak subscriber loop is indicated. Process flow then continues immediately to block 160 at which the MIU dials the central station as described in more detail later.

If, however, the power supply voltage $V_s$ has not yet dropped to less than 5 volts, then the next load resistor is switched in to load the bus at block 140. The processor then waits for the MIU to stabilize at block 145 after which a test is conducted at decision block 150 to determine if the power supply voltage $V_s$ has now decreased to less than 5 volts. If $V_s$ has now decreased to less than 5 volts, then the last load resistor to be switched in is released at block 157 to return the MIU to the immediately prior loading level. Process flow then continues to block 160 at which the MIU dials the phone number for the central station as will be described in more detail subsequently.

If, however, at decision block 150 it was determined that the power supply voltage $V_s$ has not yet dropped to less than 5 volts, then a test is made at decision block 155 to determine if all loading resistors have been selected. If all loading resistors have not yet been selected and the bus is not yet fully loaded, then process flow continues back to block 140 at which the next loading resistor is switched in to incrementally increase the loading of the bus and MIU. However, if all loading resistors are found to be selected at decision block 155, then process flow continues to block 160 at which the MIU dials the central station in preparation for a data exchange as now described.

Once block 160 is reached, either via block 135, via block 157 or via block 155, the MIU is at the selected and controlled loading level. At block 160, the MIU dials the preprogrammed central processing station number or other designated station number in preparation for a telemetry exchange therewith. While, for convenience, block 165 appears at this point as a discrete step or block in the flowchart of FIG. 2, in actual practice, block 165 is continually being executed substantially at all times during the entire process flow indicated by the flow chart.

Block 165 indicates that comparator U21 checks at all times to see if the power supply voltage $V_s$ is less than 4 volts and, if so, the processor is reset, a stop pulse is immediately generated and the MIU disengages the phone line. This monitoring and disengagement of the phone line can occur during the time the MIU is dialing the phone number in block 160 or at any other time while the MIU is in the active state after the expiration of the power-up guard time (approximately 2.8 second in one embodiment).

After dialing the phone number, the telemetry data which the MIU has collected is uploaded to the central processing station at block 170. Then, if desired, at block 175 the central station downloads a new call-in time (alarm time) and/or new call-in phone number or other information to reprogram the MIU for future action. The MIU then hangs up and releases the phone line at block 180, thus re-entering the static state. Flow then continues back to block 105 where the MIU continually checks to see if the new alarm time has been reached.

It is again emphasized that once the MIU has been powered-up or initialized, if at any time (excepting the 2.8 second guard time) when the MIU is in the active state (phone line seized by MIU for the purpose of engaging in a telemetry transaction with the central station), should the power supply voltage $V_s$ drop below 4 volts (thus indicating that a contending telephone device has gone off-hook), then the MIU generates a stop pulse and immediately disengages from the phone line (block 165) and re-enters the static state. A high reliability dynamic off-hook detector is thus provided.

It is noted that in block 157, if all loading resistors are equal-valued, then the loading resistor which is released need not necessarily be precisely the last one which was selected. Rather, releasing any one of the selected load resistors will suffice. However, if the loading resistors are of different values, then in block 157, the last loading resistor that was selected would typically be the one released.

A loading algorithm has thus been described above in blocks 130, 135, 140, 145, 150, 155 and 157 of the flowchart of FIG. 2. While this algorithm operates properly, it has been found that its speed and performance can be improved. In the embodiment described above, the adaptive loading process begins by first unloading the data bus. Subsequently, load resistors are switched in, one at a time, until voltage comparator U21 indicates that the desired operating conditions (MIU loading level) had been reached. As each resistor is switched in, the processor must wait a substantial length of time before checking the comparator output, as the long time constants associated with the power supply (and the gradual but progressive loading) do not encourage this voltage to change instantaneously. Consequently, the time it takes for the algorithm to accomplish its task depends upon the number of resistors selected. Each time the MIU enters the active state this somewhat time-consuming algorithm of FIG. 2 is repeated. To shorten the time it takes to adaptively load the MIU, it is possible to modify the algorithm to improve its speed in the following manner.

Although maintenance activity on the phone lines and the central office equipment can change the subscriber loop characteristics drastically, in the absence of such changes the typical loop characteristics tend to remain fairly constant over a period of several months. Since the processor has a nonvolatile memory 42 available, it is possible to store the exact binary state of the bus (ie. the loading resistor selections) from a prior MIU session, or similar data based on multiple prior sessions, in nonvolatile memory 42. When the MIU becomes active again, this stored value can be recalled from memory 42 and used as the present value for adjusting the load, thereby shortening the time the algorithm takes to complete its task.

It is noted that in actual practice, if the number of activated load resistors is stored from the last time the MIU entered the active state, then this number can be recalled and used as the present number of load resistors the next time the MIU enters the active state. In this case, the present loading level of the MIU in the active state is effectively set to the old loading level of the MIU stored from the last time the MIU was in the active state.

Alternatively, when the stored number of load resistors is recalled, it can be used as a starting point to derive a new number of resistors which will be used to load the MIU. For example, in one embodiment of the invention, if six (6) load resistors were activated when the MIU initially entered the active state, then the number 6 would be stored in memory. The number 6 would then be recalled from memory the next time the MIU entered the active state. In one case, six resistors on bus 45 would then be activated to load the MIU the next time the MIU entered the active state. In some applications, it may be desirable to recall the stored number of resistors (6 in this example) and employ a number relatively close to this value (4 resistors, for example) as a starting point. Use of such an offset from the recalled number of load resistors will still provide improved speed performance in the modified loading algorithm since the algorithm will not have to cycle through all the way from the initial no load resistor condition.

It is also noted that rather than storing the number of resistors in the activated load resistor configuration, the old resistor configuration used the last time the MIU entered the active state can itself be stored and recalled the next time the MIU enters the active state.

Figure 3:
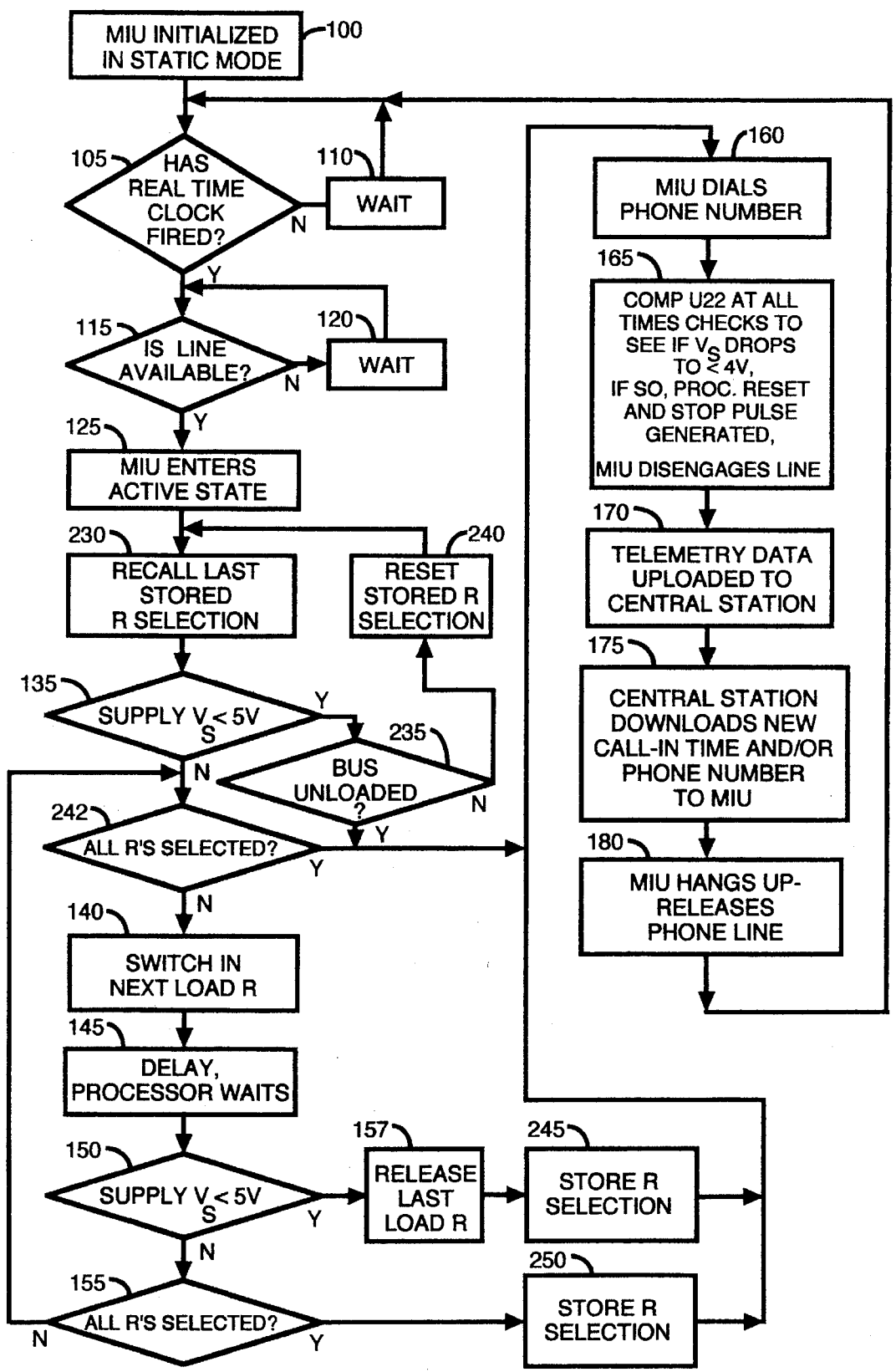
FIG. 3 is a flow chart depicting the operational flow of a more efficient embodiment of the present invention.

More particularly, the flowchart of FIG. 3 implements one such modified algorithm. The flowchart of FIG. 3 is identical to the flowchart of FIG. 2 with like numbers indicating like functional blocks, except for the differences now discussed. After the MIU enters the active state at block 125, rather than unloading the bus by releasing all load resistors as indicated at block 130 in FIG. 2, instead the loading resistor selection used during the last time the MIU was in the active state is employed as indicated at block 230 in FIG. 3. In other words, if the last time the MIU was in the active state, resistors $R_5$, $R_6$ and $R_7$ were switched in to load the bus, then resistors $R_5$, $R_6$ and $R_7$ will again be switched in this time. Once these resistors are again switched in, the MIU waits for its circuitry to stabilize.

A test is then conducted at decision block 135 to determine if the power supply voltage $V_s$ has dropped to less than 5 volts. If the power supply voltage $V_s$ has dropped to less than 5 volts, then a subsequent test is conducted at decision block 235 to see if the bus is unloaded (ie. all loading resistors are not switch in). If it is found that $V_s$ is less than 5 volts (block 135) and this is not the case where the bus is unloaded (block 235), this indicates that line conditions have changed and the MIU loading should be recalibrated. In this instance, process flow continues to block 240 at which the MIU resets the stored resistor selection (ie. changes the resistor setting stored in non-volatile RAM to indicate that no loading resistors are selected—the bus is unloaded). Flow then continues back to block 230 and the flowchart loop is re-entered.

However, if at decision block 135 it is determined that $V_s$ has dropped to less than 5 volts and at decision block 235 it is determined that the bus is unloaded (no resistors selected), then flow continues to block 160 at which the MIU dials the central station in preparation for a data exchange.

If a determination was made at decision block 135 that $V_s$ has not dropped to less than 5 volts, then a further test is conducted at decision block 242 to see of all loading resistors are selected. If $V_s$ has not dropped to less than 5 volts and all resistors are selected, this indicates that a strong subscriber loop is present and flow continues to block 160 where the MIU dials the central station in preparation for a data exchange.

If, however, it was found at decision block 242 that all loading resistors were not selected, then the next loading resistor is switched in at block 140 to increase the loading on the bus. The processor then waits at block 145 for the MIU to stabilize and a test is conducted at decision block 150 to see if $V_s$ has now dropped to less than 5 volts. If so, then the last loading resistor is released at block 157 and the present loading resistor selection is stored in nonvolatile RAM at block 245. Flow then continues to block 160 where the MIU dials the central station in preparation for a data exchange.

If a determination was made at decision block 150 that $V_s$ has not yet dropped to less than 5 volts, then a further test is conducted at block 155 to see if all loading resistors are selected. If all loading resistors are not selected, then flow continues back to block 240 and the flowchart loop is re-entered so that loading can be adjusted further. However, if at decision block 155 it is found that all resistors are selected, then a strong subscriber loop is indicated. In this case, the present resistor selection is stored in non-volatile RAM at block 250 and process flow continues to block 160 at which the MIU dials the central station in preparation for a data exchange.

It is noted that when it is stated above that the resistor selection is stored in non-volatile RAM, either the particular selection of resistors is stored, or if all resistors are equal-valued, just the number of resistors switched in by the MIU needs to be stored. In either the case where the loading resistors are equal valued or non-equaled value, the modified algorithm will perform satisfactorily with the particular selection of loading resistors being stored for future pre-loading reference.

VII. Alternative Embodiments

As noted earlier, because CMOS inputs on the data bus could not be allowed to float, it is necessary to resistively terminate the bus. The preferred embodiment of the invention capitalizes on this requirement by placing the load resistors on the bus, selecting a resistor value which would properly terminate the bus while simultaneously providing adequate range for the adaptive loading technique. While the dual function of these bus loading resistors is economically attractive since it requires few extra parts, other methods can be used to dynamically control the loading of the power supply on the meter side (control side) of the MIU. For instance, a programmable current source in parallel with zener diode D7 would work just as well, albeit more complicated. A main requirement of the invention is that the loading on the meter side (control side) of the MIU be adjustable. Many different methods of how to electrically implement the variable load feature of the invention are possible.

While the preferred embodiment uses a microprocessor to dynamically adjust the loading of the subscriber loop, it is not at all necessary that a processor be required or that the procedure be digital. For instance, those skilled in the art could construct an analog circuit which can monitor the supply voltage and vary a load across it until its voltage is pulled down to a desired value. A modified shunt regulator could be employed for this purpose.

As noted above, a shunt regulator loads its regulated output until the voltage reaches a predetermined level. This is a continuous process. If the regulated output voltage starts to fall, the device instantly shunts away less current encouraging the voltage to increase and if the voltage rises it shunts away more current to load down (lower) the output. A shunt regulator can be employed using an operational amplifier to control a power transistor configured as a current shunt. Using a stable voltage reference, a shunt regulator can be built with these few components in a closed loop feedback arrangement. In accordance with the invention, however, once the regulator has initially acquired shunt regulation, the continuous correction (ie. feedback) of the regulated output is halted. Without the feedback, the voltage of the output will vary as the load current changes. If some of the regulator's input current is robbed away, as when another telephone device comes off-hook, the output voltage will drop making the event predictable and therefore detectable. In other words, the modified shunt regulator output voltage (after the feedback correction process is halted) can be monitored to ascertain when the input current has changed. In the preferred embodiment the feedback loop is software controlled. In the modified shunt regulator approach described above, feedback is implemented using an analog approach.

It should be noted that automatic meter reading systems represent only one application where telephone line telemetry devices and techniques are utilized. Although this invention teaches its novel method and apparatus with respect to these AMR applications, those skilled in the art will appreciate that these same methods and apparatus are equally suitable for use in a broad and diverse range of applications which employ remote monitoring techniques and devices. A partial list of other applications would include copy and vending machine monitors, industrial monitoring of remote processes (for instance, oil field flow systems) and remote monitoring of diesel generators or similar industrial equipment.

VIII. Methodology

While the above description sets forth an improved telemetry device apparatus including a dynamic off-hook detector, it is clear that a method of operating that apparatus is also disclosed. More particularly, a method of operating a telemetry device is disclosed wherein the device includes a voltage deriving circuit coupled to a phone line for deriving a voltage dependent on the loop current of the phone line. The method includes the step of the telemetry device entering an active state during which the device seizes the phone line and during which collected data is to be transmitted back to a central station. The method includes the step of loading the device down until the derived voltage reaches a first predetermined voltage level. The method further includes the step of detecting when the derived voltage decreases to a second predetermined voltage level less than the first predetermined voltage level to indicate that a contending telephone device coupled to the phone line has come off-hook during the active state.

IX. Conclusion

In contrast with prior approaches, the dynamic off-hook detector of the present invention advantageously requires neither an A/D converter nor any measurement whatsoever on the primary side (telephone line) of the MIU. Because the loop current is not measured on the primary side, no extra components are required on the primary side of the MIU to implement the dynamic off-hook detector function.

Unique to this invention, the dynamic off-hook detector adjusts the loop current by adaptively loading the control side (meter side) of the MIU. While adaptively controlling the power dissipated on the control side of the MIU correspondingly alters the loop current on the primary side, the technique requires no extra components whatsoever on the primary side of the MIU.

In addition to providing an improved dynamic off-hook detector, this invention offers other significant benefits. Because the MIU dynamically adjusts the loop current, it effectively forms a shunt voltage regulator thereby eliminating the requirement for a separate voltage regulator to stabilize the operating voltage of the microprocessor. This has the added advantage of reducing the cost and complexity of the telemetry device which incorporates this invention. In other words, both a voltage regulator and a dynamic off-hook detector are economically provided by the same circuitry.

The present invention is an improvement to the dynamic off-hook detection technique of current starving or current robbing the active MIU back to its static mode. More particularly, the invention dynamically adjusts the subscriber loop current to compensate for the variety of line conditions encountered. By adjusting the loop current accordingly, the MIU can precisely set what portion of that loop current must be shunted away, ostensibly by another off-hook telephone device, so as to current starve the MIU into releasing the telephone line.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A telemetry device for collecting and transmitting data over a phone line to a central station, said phone line conducting a loop current, said telemetry device comprising:

data collecting means for collecting data at a remote location;

transmitting means, coupled to said collecting means, for transmitting said data over said phone line to said central station during an active state of said device in which said telemetry device seizes the phone line;

voltage deriving means, coupled to said phone line, for deriving a voltage dependent on the loop current of said phone line;

variable load pre-loading means, situated in said telemetry device, for variably loading said telemetry device down during said active state to draw an amount of loop current which is varied until said voltage reaches a first predetermined voltage level, and voltage drop detecting means, coupled to said voltage deriving means, for detecting when said voltage decreases to a second predetermined voltage level less than said first predetermined voltage level, thus indicating that a contending telephone device coupled to said phone line has come off-hook during said active state.

2. The telemetry device of claim I further comprising a real time clock, coupled to said transmitting means, for causing said telemetry device to enter said active state at an appointed alarm time to transmit said data, said telemetry device otherwise being in a static state.

3. A telemetry device for collecting data and transmitting said data over a phone line to a central station during an active state of said telemetry device during which said device seizes the phone line, said telemetry device otherwise remaining in a static state, said phone line conducting a loop current, said telemetry device exhibiting a current load on said phone line, said telemetry device comprising:

voltage deriving means, coupled to said phone line, for deriving a voltage dependent on the loop current of said phone line, said voltage being designated the derived voltage;

a microprocessor for controlling said telemetry device and for collecting data from devices external to said telemetry device;

a peripheral bus coupled to said microprocessor, said bus including a plurality of data lines;

a plurality of pull up/load resistors respectively coupled to said plurality of data lines;

control means, within said microprocessor, for activating during said active state an increasing number of said pull up/load resistors to increase the current load exhibited by said telemetry device on the phone line until said derived voltage reaches a first predetermined voltage level, and voltage drop detecting means, coupled to said voltage deriving means, for detecting when said derived voltage decreases to a second predetermined voltage level less than said first predetermined voltage level, thus indicating that a contending telephone device coupled to said phone line has come off-hook during said active state.

4. The telemetry device of claim 3 wherein said telemetry device includes a phone line side and a meter side coupled together by an electrically isolative barrier therebetween, said line side of said telemetry device being coupled to said phone line, said telemetry device further including a power supply situated on said meter side of said telemetry device for drawing power from said line side to provide a power supply voltage to said meter side.

5. A telemetry device for collecting data and transmitting said data over a phone line to a central station during an active state of said telemetry device during which said telemetry device seizes the phone line, said telemetry device otherwise remaining in a static state, said telemetry device including a phone line side and a meter side coupled together by an electrically isolative barrier therebetween, said line side of said telemetry device being coupled to said phone line, said phone line conducting a loop current, said telemetry device exhibiting a current load on said phone line, said telemetry device comprising:

a power supply situated on said meter side of said telemetry device for drawing power from said line side to provide a power supply voltage to said meter side;

a microprocessor for controlling said telemetry device and for collecting data from devices external to said meter side;

a peripheral bus coupled to said microprocessor, said bus including a plurality of data lines;

a plurality of pull up/load resistors respectively coupled to said plurality of data lines;

control means, within said microprocessor, for activating during said active state an increasing number of said pull up/load resistors to increase the current load exhibited by said telemetry device on the phone line until said power supply voltage reaches a first predetermined voltage level, and voltage drop detecting means, coupled to said power supply, for detecting when said power supply voltage decreases to a second predetermined voltage level less than said first predetermined voltage level, thus indicating that a contending telephone device coupled to said phone line has come off-hook during said active state.

6. The telemetry device of claim 5 further comprising memory means for storing the number of resistors activated to reach said first predetermined voltage level during a first time when said telemetry device enters said active state.

7. The telemetry device of claim 6 further comprising means for recalling said number of resistors from said memory means the next time said device enters the active state and re-using that number of resistors to again load said telemetry device.

8. The telemetry device of claim 6 further comprising means for recalling said number of resistors from said memory means the next time said telemetry device enters the active state and using this recalled number of resistors as a starting value to determine the number of pull-up resistors activated to again load said telemetry device.

9. The telemetry device of claim 5 wherein the pull up/load resistors activated by the control means during a first time when said telemetry device enters said active state define a resistor configuration, said telemetry device further comprising memory means for storing the resistor configuration.

10. The telemetry device of claim 9 further comprising means for recalling said resistor configuration from said memory means the next time said telemetry device enters said active state and re-using that resistor configuration to again load said telemetry device.

11. The telemetry device of claim 5 further comprising at least one peripheral device coupled to said peripheral bus.

12. The telemetry device of claim 11 wherein said peripheral device comprises a real time clock.

13. A telemetry device for collecting data at a remote location and transmitting said data over a phone line to a central station, at least one other contending telephone device being coupled to said phone line at said remote location, said phone line conducting a loop current, said telemetry device comprising:

data collecting means for collecting data at said remote location during a static state of said telemetry device;

transmitting means, coupled to said collecting means, for transmitting said data over said phone line to said central station during an active state of said telemetry device during which said telemetry device seizes said phone line;

a power supply, coupled to said phone line, for supplying power supply voltage to said telemetry device;

static off-hook detector means for monitoring said phone line during the static state of said telemetry device to determine when said contending telephone device goes off-hook and preventing said telemetry device from entering said active state when said contending telephone device goes off-hook during said static state;

dynamic off-hook detector means for detecting, during said active state, when said contending telephone device goes off-hook, said dynamic off-hook detector means including:

variable load preloading means for variably loading said telemetry device to draw progressively higher amounts of loop current from said phone line until said power supply voltage decreases to a first predetermined level, and voltage drop detecting means, coupled to said power supply for detecting when said power supply voltage decreases to a second predetermined voltage level less than said first predetermined voltage level, thus indicating that a contending telephone device coupled to said phone line has come off-hook during said active state.

14. The telemetry device of claim 13 further comprising phone line disengaging means, coupled to said voltage drop detecting means, for causing said telemetry device to disengage said phone line when said dynamic off-hook detector determines that said contending telephone device has come off-hook during said active state.

15. A method of operating a telemetry device which is coupled to a phone line exhibiting a loop current, said telemetry device including a voltage deriving circuit coupled to the phone line for deriving a voltage dependent on the loop current of the phone line, said method comprising the steps of:

entering an active state, by said telemetry device, during which said telemetry device seizes said phone line and collected data is to be transmitted back to a central station;

variably pre-loading said telemetry device down to draw an amount of loop current which is varied until said voltage reaches a first predetermined voltage level, and detecting when said voltage decreases to a second predetermined voltage level less than said first predetermined voltage level to indicate that a contending telephone device coupled to said phone line has come off-hook during said active state.

16. A method of operating a telemetry device, said telemetry device including a power supply coupled to a phone line to derive power supply voltage therefrom, said telemetry device including a microprocessor coupled to a bus including a plurality of data lines to which a plurality of pull-up resistors are respectively coupled, said method comprising the steps of:

entering an active state, by said telemetry device, during which said telemetry device seizes said phone line and collected data is to be transmitted back to a central station;

activating, by said microprocessor during said active state, said pull-up resistors to increasingly load said telemetry device to draw progressively higher amounts of current from said phone line until said power supply voltage decreases to a first predetermined level, and detecting when said power supply voltage decreases to a second predetermined voltage level less than said first predetermined voltage level to indicate that a contending telephone device coupled to said phone line has come off-hook during said active state.

17. The method of claim 16 wherein said activating step includes activating an increasing number of said pull-up resistors to increasingly load said telemetry device to draw progressively higher amounts of current from said phone line until said power supply voltage decreases to said first predetermined level.

18. The method of claim 17 including the step of storing the number of resistors activated in said activating step when said telemetry device enters the active state.

19. The method of claim 18 including the step of reactivating, during the next time said telemetry device enters the active state, the same number of resistors as said telemetry device employed the last time it entered the active state.

20. The method of claim 18 including the step of recalling the number of resistors stored in said storing step and using this recalled number of resistors as a starting value to determine the number of pull-up resistors activated the next time said telemetry device enters the active state.

21. The method of claim 17 including the step of reactivating, during the next time said telemetry device enters the active state, the same resistors as said telemetry device employed to load said telemetry device the last time it entered the active state.

* * * * *